United States Patent
Kim et al.

(10) Patent No.: US 9,325,903 B2
(45) Date of Patent: Apr. 26, 2016

(54) METHOD AND APPARATUS FOR PROCESSING IMAGE

(71) Applicant: Samsung Electronics Co., Ltd, Gyeonggi-do (KR)

(72) Inventors: Moon-Soo Kim, Seoul (KR); Heung-Sik Jung, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/187,103

(22) Filed: Feb. 21, 2014

(65) Prior Publication Data

US 2014/0232921 A1  Aug. 21, 2014

(30) Foreign Application Priority Data

Feb. 21, 2013  (KR) .................. 10-2013-0018632

(51) Int. Cl.
*H04N 5/232*  (2006.01)
*H04N 5/225*  (2006.01)

(52) U.S. Cl.
CPC ......... *H04N 5/23293* (2013.01); *H04N 5/2258* (2013.01)

(58) Field of Classification Search
CPC .................... H04N 5/2258; H04N 5/23293
See application file for complete search history.

(56) References Cited

U.S. PATENT DOCUMENTS

| 8,866,943 | B2* | 10/2014 | Park et al. ...................... 348/267 |
| 8,988,558 | B2* | 3/2015 | Chong et al. .................. 348/239 |
| 2003/0117501 | A1* | 6/2003 | Shirakawa ................. 348/218.1 |
| 2012/0008011 | A1* | 1/2012 | Garcia Manchado ..... 348/231.2 |
| 2012/0274808 | A1* | 11/2012 | Chong et al. .................. 348/234 |
| 2014/0354759 | A1* | 12/2014 | Cranfill et al. ............... 348/14.1 |

FOREIGN PATENT DOCUMENTS

JP  2011-250340  12/2011

* cited by examiner

*Primary Examiner* — James Hannett

(57) ABSTRACT

A method in an electronic device, the method comprising displaying a first picture acquired from a first image sensor on a display functionally connected to the electronic device, and displaying a second picture acquired from a second image sensor on display, wherein the first picture and the second pictures are simultaneously displayed as a preview image on the display. An electronic device for processing an image comprises at least one memory configured to store image information and an image processing module, and at least one processor configured to execute the image processing module, wherein the image processing module comprises instructions of displaying a first picture acquired from a first image sensor on a display functionally connected to the electronic device, and according to a first input, displaying a second picture acquired from a second image sensor on the display, wherein the first picture and the second picture are simultaneously displayed as a preview image on the display.

23 Claims, 13 Drawing Sheets

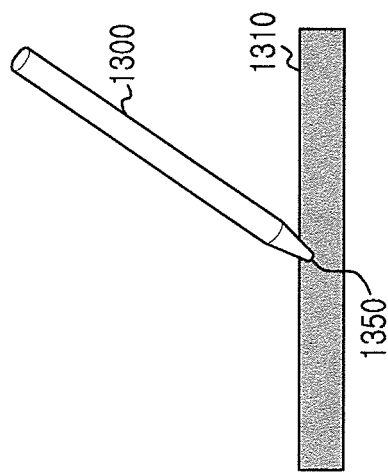
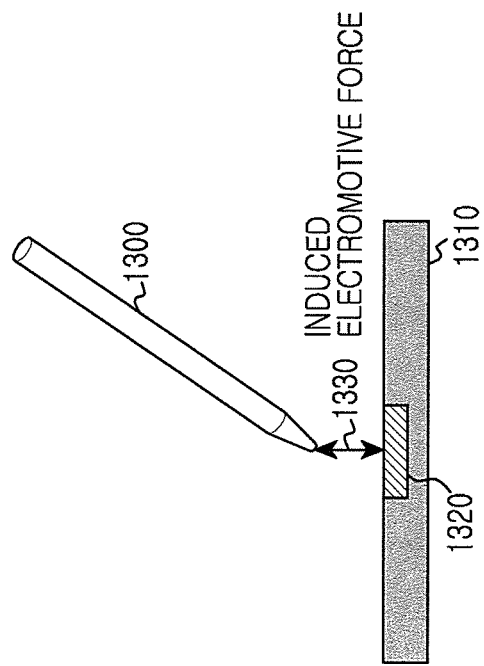

METHOD AND APPARATUS FOR PROCESSING IMAGE

PRIORITY

The present application is related to and claims priority under 35 U.S.C. §119(a) to a Korean Patent Application No. 10-2013-0018632 filed in the Korean Intellectual Property Office on Feb. 21, 2013, the contents of which are herein incorporated by reference.

TECHNICAL FIELD

Various embodiments of the present disclosure relate to a method of image capturing and an electronic device thereof.

BACKGROUND

Some electronic devices (e.g., portable terminals, mobile terminals, mobile pads, media players, tablet computers, handheld computers, Personal Digital Assistants (PDAs) or the like) can provide a digital camera function to take a picture of mega pixels or more and display the taken picture through a high-definition screen, and have a plurality of image sensors for the digital camera function to capture one or more images.

SUMMARY

A method in an electronic device, the method comprising displaying a first picture acquired from a first image sensor on a display functionally connected to the electronic device, and displaying a second picture acquired from a second image sensor on display, wherein the first picture and the second pictures are simultaneously displayed as a preview image on the display.

In certain embodiments, the method further comprises recording the first picture while displaying the first picture on the display according to a second input.

In certain embodiments, according to the first input, the second image sensor is configured to change from a wait state to an operation state.

In certain embodiments, the first input is entered through one of a hovering motion, a voice instruction, a pre-defined motion, and a direct touch.

In certain embodiments, the pre-defined motion is detected from a motion recognition sensor or a third image sensor.

In certain embodiments, the method further comprises splitting the display into at least a first screen and a second screen, and displaying the first picture on the first screen and the second picture on the second screen.

In certain embodiments, the first image sensor is located on a back side of the electronic device, and the second image sensor is located on a front side of the electronic device.

An electronic device for processing an image comprises at least one memory configured to store image information and an image processing module, and at least one processor configured to execute the image processing module, wherein the image processing module comprises instructions of displaying a first picture acquired from a first image sensor on a display functionally connected to the electronic device, and according to a first input, displaying a second picture acquired from a second image sensor on the display, wherein the first picture and the second picture are simultaneously displayed as a preview image on the display.

In certain embodiments, according to the first input, the second image sensor is configured to change from a wait state to an operation state.

In certain embodiments, the first input is entered through one of a hovering motion, a voice instruction, a pre-defined motion, and a direct touch.

An electronic device for processing an image comprises a processor configured to cause a display to display a first picture acquired from a first image sensor on the display functionally connected to the electronic device, and display a second picture acquired from a second image sensor, wherein the first picture and the second picture are simultaneously displayed as a preview image on the display.

A method for processing an image in an electronic device, the method comprises when a first camera is in an operation state and a second camera is in a wait state, acquiring a first picture from the first camera and previewing the acquired first picture, according to a first photographing instruction, recording the first picture of the first camera, when a hovering motion input is detected, changing the second camera from the wait state to the operation state and acquiring a second picture from the second camera, simultaneously previewing the first picture and the second picture using a Picture In Picture (PIP) function; and when a touch for a dual picture recording instruction is detected, synthesizing and recording the first picture and the second picture on one frame.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 13A and 13B are diagrams for describing a proximity touch and a direct touch according to the second embodiment of the present disclosure.

DETAILED DESCRIPTION

Figure 1A:
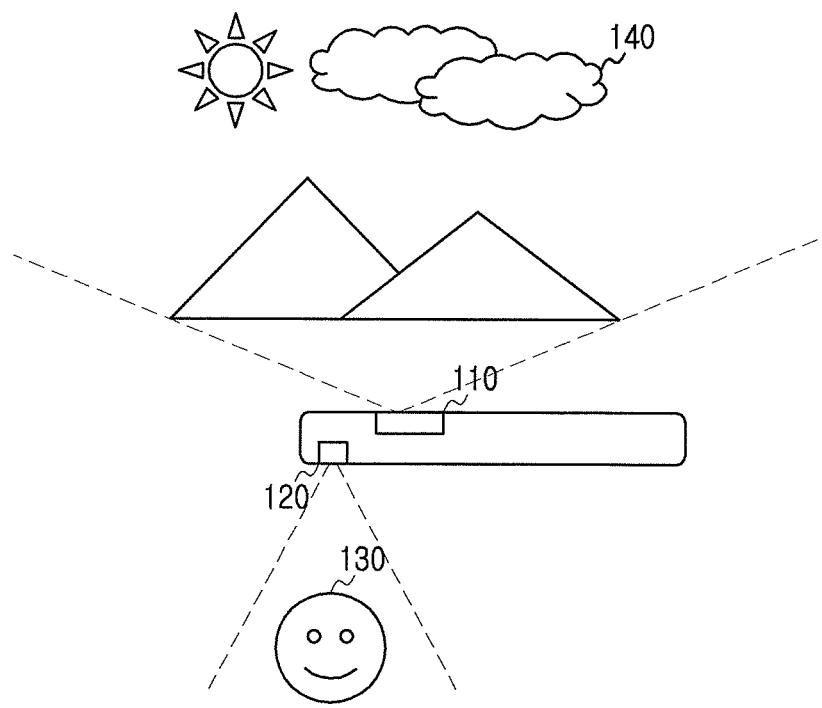
FIGS. 1A and 1B are an example of performing dual recording in a portable terminal including dual cameras according to one embodiment of the present disclosure.

FIGS. 1A through 13B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be different depending on user and operator's intention or practice. Therefore, the terms should be defined on the basis of the disclosure throughout this specification. Also, each constituent element described in this specification can indicate, unless otherwise specified, singular or plural objects.

Various embodiments of the present disclosure relate to a method and apparatus for taking a plurality of images that are captured through at least one or more image sensors functionally connected with an electronic device (e.g., a smart phone, a tablet computer or the like).

According to various embodiments of the present disclosure, an electronic device (e.g., a portable terminal) can include a plurality of image sensors corresponding to its 1st surface (e.g., a front part, a left part, or a lower part) and 2nd surface (e.g., a rear part, a right part, or an upper part), for instance, can include the plurality of image sensors capturing images in the direction of the 1st surface and 2nd surface. For example, the electronic device can shoot body parts (e.g., a face) of a user using the image sensor corresponding to the front part, and shoot the background using the image sensor corresponding to the rear part. Further, the electronic device can select picture data intended to be stored through an image sensor switching menu. That is, the portable terminal can store picture data (e.g., a still or moving image) that is acquired through one image sensor selected among the image sensors corresponding to the front part or rear part.

According to various embodiments of the present disclosure, the electronic device can simultaneously record as a moving image or a still image a background picture acquired through the image sensor corresponding to the 1st surface (e.g., the image sensor arranged in the rear part) of the electronic device and a picture of body parts (e.g., a face, the body, legs, arms and the like) of a user acquired through the image sensor corresponding to the 2nd surface (e.g., the image sensor arranged in the front part). According to some exemplary embodiments, the electronic device may be set to capture two or more images at two or more different angles through one image sensor (e.g., a rotatable image sensor), or capture three or more images at three or more different angles through three or more image sensors. Also, according to some exemplary embodiments, at least one of the image sensors can be installed in the corresponding surface (e.g., front part, rear part, upper part, lower part, left part, or right part) of the electronic device or can be wireless connected to the electronic device using local area communication, for example, Bluetooth.

Figure 1B:
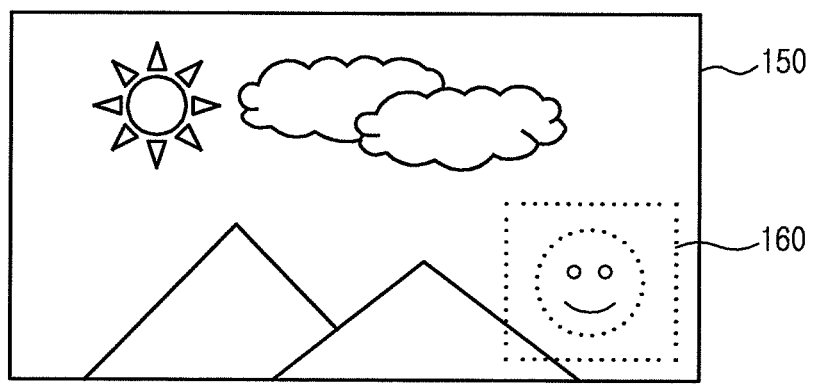

FIGS. 1A and 1B illustrate dual recording in a portable terminal including dual cameras according to various exemplary embodiments of the present disclosure.

Referring to FIG. 1A, the portable terminal has cameras 120 and 110 arranged in its front part and rear part, and can record a user picture 130 using the camera 120 arranged in its front part and record a background picture 140 using the camera 110 arranged in its rear part.

Referring to FIG. 1B, the portable terminal can display the background picture 140 acquired by the camera 110 arranged in the rear part and the user picture 130 acquired by the camera 120 arranged in the front, as a background picture 150 and a user picture 160 in one screen, using a Picture In Picture (PIP) function. The PIP function is a function of simultaneously displaying a small screen apart from the original screen. The background picture 150 becomes a mother screen, and the user picture 160 becomes a PIP. At this time, the user picture 160 can be variously arranged within the background picture 150. Also, according to various exemplary embodiments, the user picture 160 can become the mother screen, and the background picture 150 can become the PIP.

According to cases, when a plurality of cameras record pictures, the plurality of cameras each record the pictures with being simultaneously turned on. And, when any one camera stops recording the picture, the stopped camera becomes a wait state.

At this time, when the plurality of cameras are recording the pictures, if the portable terminal keeps tuning on the camera being waiting, there can be a problem of excessive current consumption. And, if the portable terminal turns off the camera being waiting, a time (hereinafter, referred to as a 'camera startup time') for again turning on and starting up the camera being waiting upon input of a user instruction for simultaneous photographing is required, so there can be a delay that a delay can be caused by the camera startup time.

Accordingly, there is a need for a method and apparatus for, upon dual picture recording, minimizing power consumption and a delay caused by a camera startup time in an electronic device including dual cameras.

In various exemplary embodiments of the present disclosure below, a camera can be the same meaning as an image sensor.

Figure 2A:
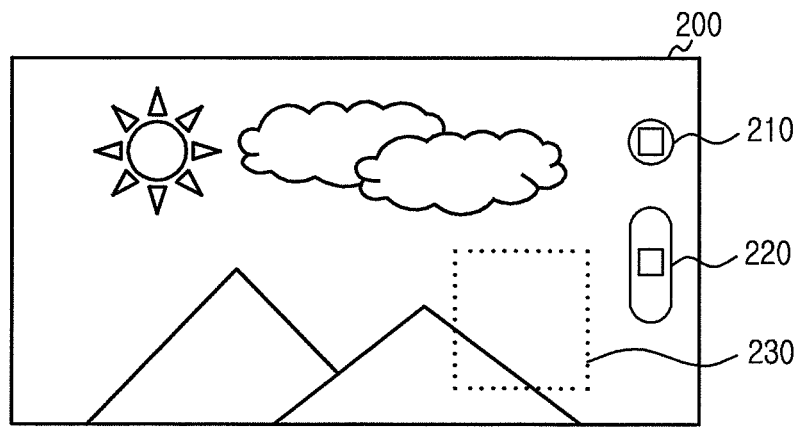
FIGS. 2A and 2B are an example of performing dual recording in a portable terminal including dual cameras according to one embodiment of the present disclosure.
Figure 2B:
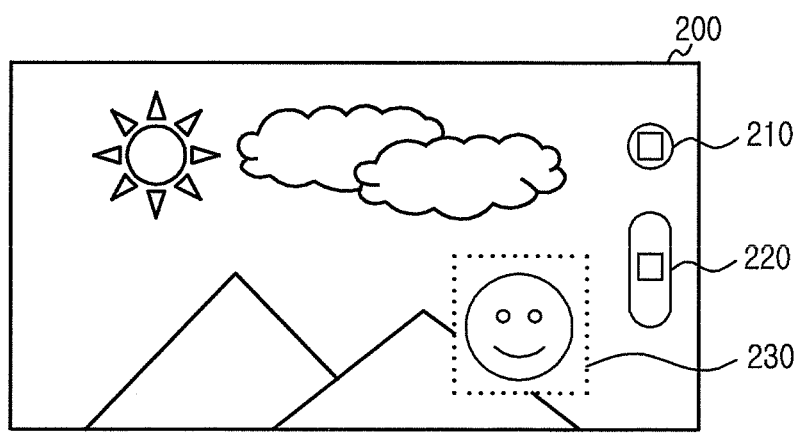

FIGS. 2A and 2B illustrate an example of performing dual recording in a portable terminal including dual cameras according to an exemplary embodiment of the present disclosure.

FIG. 2A is a diagram illustrating an example of when a 1st camera performs shooting but a 2nd camera does not perform the shooting. Desirably, the 1st camera is a camera located in rear of the electronic device, and the 2nd camera is a camera located in front of the electronic device for self-photographing. Also, the portable terminal can display a region 230 for displaying a 2nd picture of the 2nd camera.

First, if a user initially executes a camera application, the 1st camera can be started up to start preview 200 by designated pixels, and the 2nd camera can turn off in a wait state.

At this time, when a 1st shutter 210 is touched by the user, the portable terminal records and stores a 1st picture of the 1st camera. Further, when a 2nd shutter 220 is touched by the user, as in FIG. 2B, the portable terminal starts up the 2nd camera, displays (230) a 2nd picture of the 2nd camera by designated pixels, and records and stores the 2nd picture of the 2nd camera, for example. At this time, the 1st and 2nd pictures of the 1st and 2nd cameras can be synthesized and be recorded and stored as the 3rd picture, or the 1st and 2nd pictures of the 1st and 2nd cameras can be recorded and stored separately, respectively.

The 1st shutter 210 is an instruction button for capturing an image from the 1st picture of the 1st camera or starting recording the 1st picture of the 1st camera. The 2nd shutter 220 is an instruction button for capturing an image from the 2nd picture of the 2nd camera or starting recording the 2nd picture of the 2nd camera.

According to various exemplary embodiments of the present disclosure, a single specific shutter (not shown) is implemented instead of the 1st shutter 210 and the 2nd shutter 220. If the single specific shutter is touched, the portable terminal can start up the 1st camera and the 2nd camera and simultaneously synthesize the 1st and 2nd pictures of the 1st and 2nd cameras to capture one image or simultaneously start recording the 1st and 2nd pictures of the 1st and 2nd cameras. At this time, the 1st and 2nd pictures of the 1st and 2nd cameras can be synthesized and be recorded and stored as a 3rd picture, or the 1st and 2nd pictures of the 1st and 2nd cameras can be recorded and stored separately, respectively.

According to other various exemplary embodiments of the present disclosure, when a user initially executes the camera application, if the portable terminal detects each touch on the 1st shutter 210 and the 2nd shutter 220 or the user touches the single specific shutter (not shown) as in FIG. 2B, the portable terminal can simultaneously synthesize the 1st and 2nd pictures of the 1st and 2nd cameras to capture one image or can simultaneously synthesize and record the 1st and 2nd pictures of the 1st and 2nd cameras as a 3rd picture.

Figure 3:
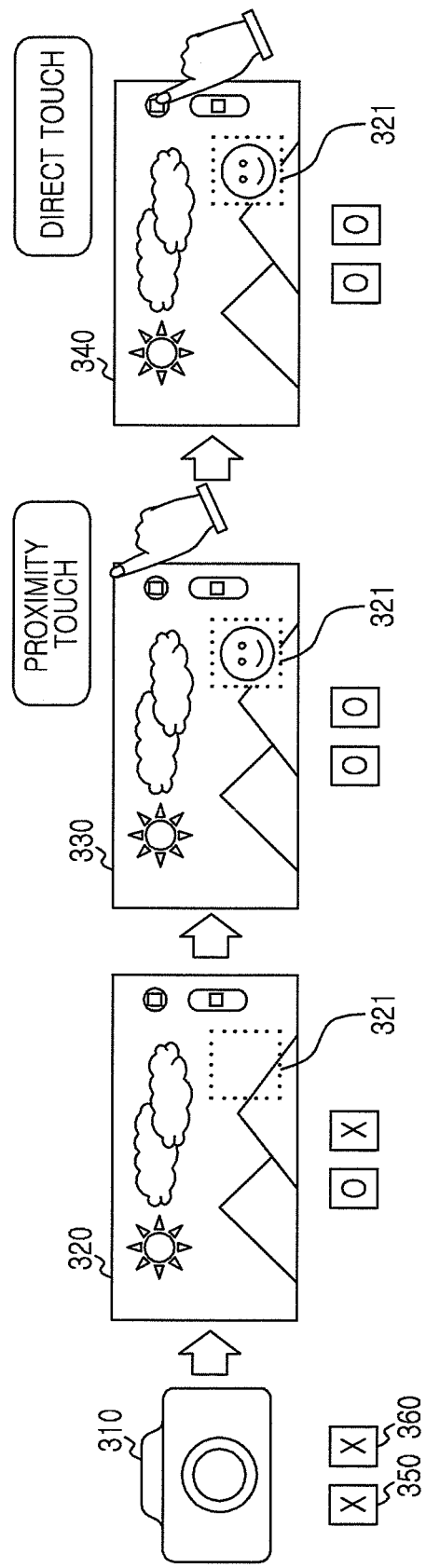
FIG. 3 is a diagram illustrating a process of controlling dual recording in a portable terminal including dual cameras according to the first embodiment of the present disclosure.

FIG. 3 illustrates a process of controlling dual recording in a portable terminal including dual cameras according to the first exemplary embodiment of the present disclosure.

Referring to FIG. 3, initially, a 1st camera and a 2nd camera are all in off states 350 and 360 as shown in a device 310. After that, if a camera application is executed, the 1st camera turns on and the 2nd camera maintains the off state as shown in a screen 320. At this time, the portable terminal can display a 1st picture of the 1st camera on a screen and further, display a region 321 in which a 2nd picture of the 2nd camera will be located. Reference numeral '350' represents an operation state of the 1st camera, and reference numeral '360' represents an operation state of the 2nd camera.

Next, if a user finger, a stylus pen (or electronic pen) or the like approaches a shutter object (e.g., the 1st shutter, 2nd shutter, or specific shutter of FIG. 2) corresponding to a dual picture recording start instruction (hereinafter, referred to as a 'proximity touch') (331), the portable terminal starts up the 2nd camera of the off state and displays the 2nd picture of the 2nd camera in the corresponding region 321 as shown in a screen 330. That is, the proximity touch indicates a state where the screen and the user finger are in proximity to each other without contact, as in FIG. 12A and FIG. 13A. According to various exemplary embodiments of the present disclosure, the portable terminal starts up the 2nd camera of the off state but does not display the 2nd picture of the 2nd camera in the corresponding region 321 and can display only a frame for confirming a location of the 2nd picture of the 2nd camera, in the corresponding region 321.

After that, if the user finger, the stylus pen (or electronic pen) or the like touches the shutter object corresponding to the dual picture recording start instruction (hereinafter, referred to as a 'direct touch') as shown in a screen 341, the portable terminal synthesizes the 1st and 2nd pictures of the 1st and 2nd cameras and starts recording the synthesized result as shown in a screen 340.

Next, when the user finger, the stylus pen (or electronic pen) or the like approaches a shutter object corresponding to a dual picture recording stop instruction (not shown), the portable terminal stops dual picture recording and stores the recorded picture.

In another implementation, when the user finger, the stylus pen (or electronic pen) or the like touches the shutter object corresponding to the dual picture recording stop instruction (not shown), the portable terminal stops the dual picture recording and stores the recorded picture.

Figure 4:
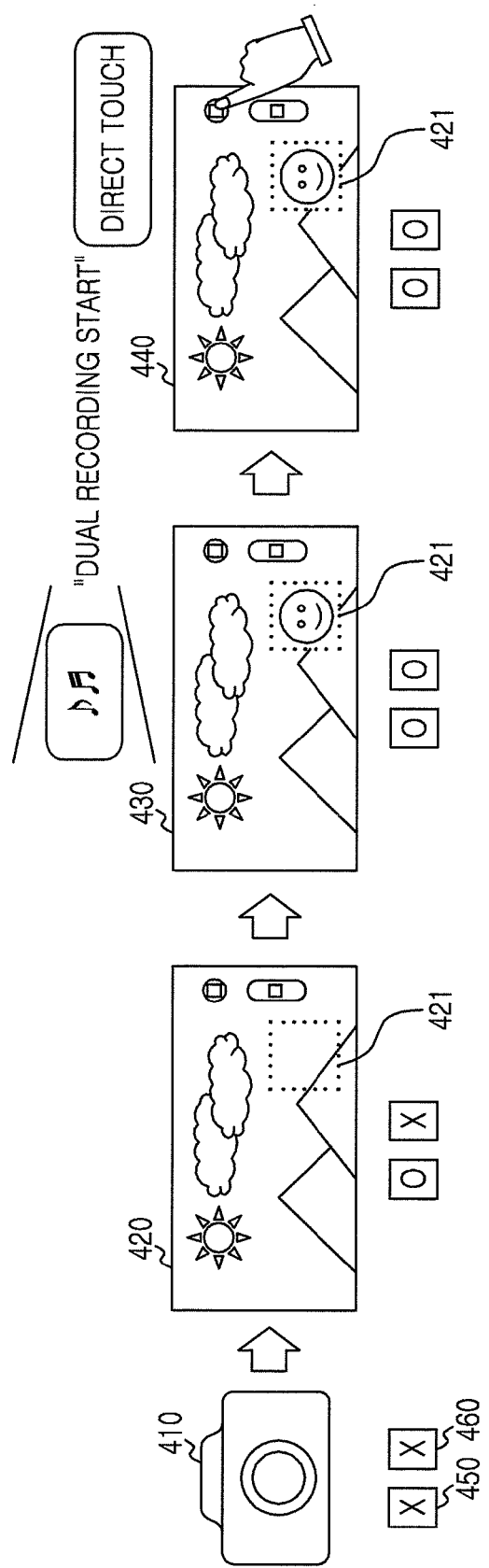
FIG. 4 is a diagram illustrating a process of controlling dual recording in a portable terminal including dual cameras according to the second embodiment of the present disclosure.

FIG. 4 illustrates a process of performing dual recording in a portable terminal equipped with dual cameras according to the second exemplary embodiment of the present disclosure.

Referring to FIG. 4, initially, a 1st camera and a 2nd camera are all in off states 450 and 460 as shown in an image processing device 410. After that, if a camera application is executed, the 1st camera turns on and the 2nd camera maintains the off state as shown in a screen 420. At this time, the portable terminal can display a 1st picture of the 1st camera on a screen and further, display a region 421 in which a 2nd picture of the 2nd camera will be located. Reference numeral '450' represents an operation state of the 1st camera, and reference numeral '460' represents an operation state of the 2nd camera.

Next, if a voice instruction for starting dual picture recording is detected as shown in a screen 431, the portable terminal starts up the 2nd camera of the off state and displays the 2nd picture of the 2nd camera in the corresponding region 421 as shown in a screen 430. According to various exemplary embodiments of the present disclosure, the portable terminal starts up the 2nd camera of the off state but does not display the 2nd picture of the 2nd camera in the corresponding region 421 and can display only a frame for confirming a location of the 2nd picture of the 2nd camera, in the corresponding region 421.

After that, if a user finger, a stylus pen (or electronic pen) or the like touches a shutter object corresponding to a dual picture recording start instruction (hereinafter, referred to as a 'direct touch'), the portable terminal synthesizes the 1st and 2nd pictures of the 1st and 2nd cameras and starts recording the synthesized result as shown in a screen 440.

Next, when a voice instruction for stopping the dual picture recording is detected (not shown), the portable terminal stops the dual picture recording and stores the recorded picture.

In another implementation, when the user finger, the stylus pen (or electronic pen) or the like touches a shutter object corresponding to a dual picture recording stop instruction (not shown), the portable terminal stops the dual picture recording and stores the recorded picture.

Figure 5:
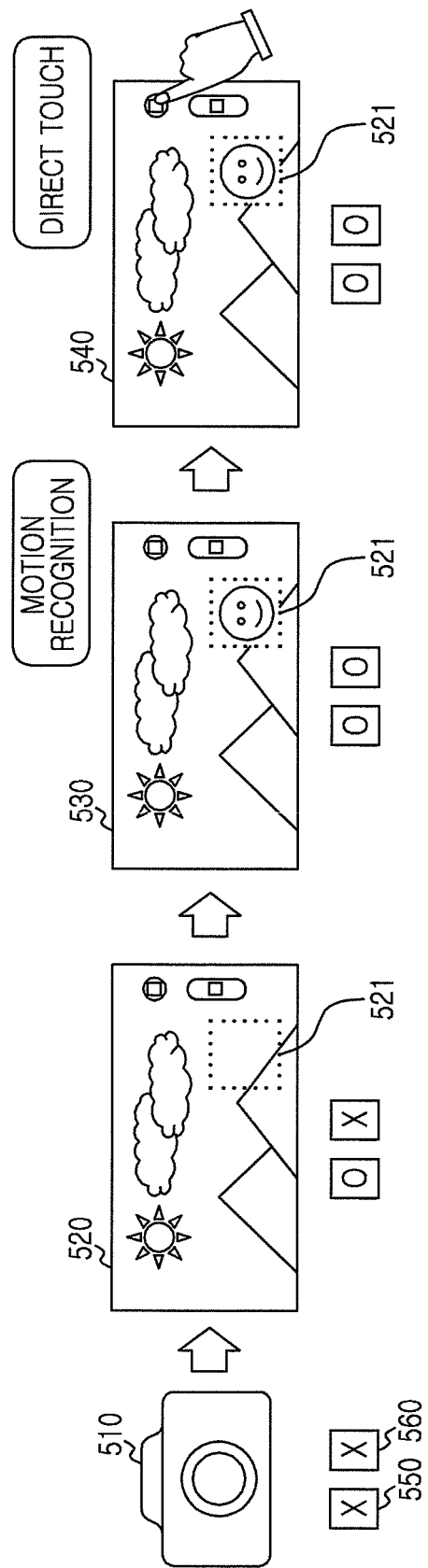
FIG. 5 is a diagram illustrating a process of controlling dual recording in a portable terminal including dual cameras according to the third embodiment of the present disclosure.

FIG. 5 illustrates a process of controlling dual recording in a portable terminal including dual cameras according to the third exemplary embodiment of the present disclosure.

Referring to FIG. 5, initially, a 1st camera and a 2nd camera are all in off states 550 and 560 (510). After that, if a camera application is executed, the 1st camera turns on and the 2nd camera maintains the off state (520). At this time, the portable terminal can display a 1st picture of the 1st camera on a screen and further, display a region 521 in which a 2nd picture of the 2nd camera will be located. Reference numeral '550' represents an operation state of the 1st camera, and reference numeral '560' represents an operation state of the 2nd camera.

Next, if a specific pre-defined motion (e.g., a motion in which a user shakes up/down the electronic device with catching with one hand) corresponding to a dual picture recording start instruction is detected through a motion recognition sensor, the portable terminal starts up the 2nd camera of the off state and displays the 2nd picture of the 2nd camera in the corresponding region 521 as shown in a screen 530. According to various exemplary embodiments of the present disclosure, the portable terminal starts up the 2nd camera of the off state but does not display the 2nd picture of the 2nd camera in the corresponding region 521 and can display only a frame for confirming a location of the 2nd picture of the 2nd camera, in the corresponding region 521. Here, the pre-defined motion can be detected through the motion recognition sensor within the electronic device.

According to various exemplary embodiments of the present disclosure, the specific motion can be determined by recognizing a user motion which is photographed through a different camera.

After that, if a user finger, a stylus pen (or electronic pen) or the like touches a shutter object corresponding to a dual picture recording start instruction (hereinafter, referred to as a 'direct touch'), the portable terminal synthesizes the 1st and 2nd pictures of the 1st and 2nd cameras and starts recording the synthesized result as shown in a screen 540.

Next, when a specific motion corresponding to a dual picture recording stop is detected (not shown), the portable terminal stops the dual picture recording and stores the recorded picture.

In another implementation, when the user finger, the stylus pen (or electronic pen) or the like touches a shutter object corresponding to a dual picture recording stop instruction (not shown), the portable terminal stops the dual picture recording and stores the recorded picture.

Figure 6:
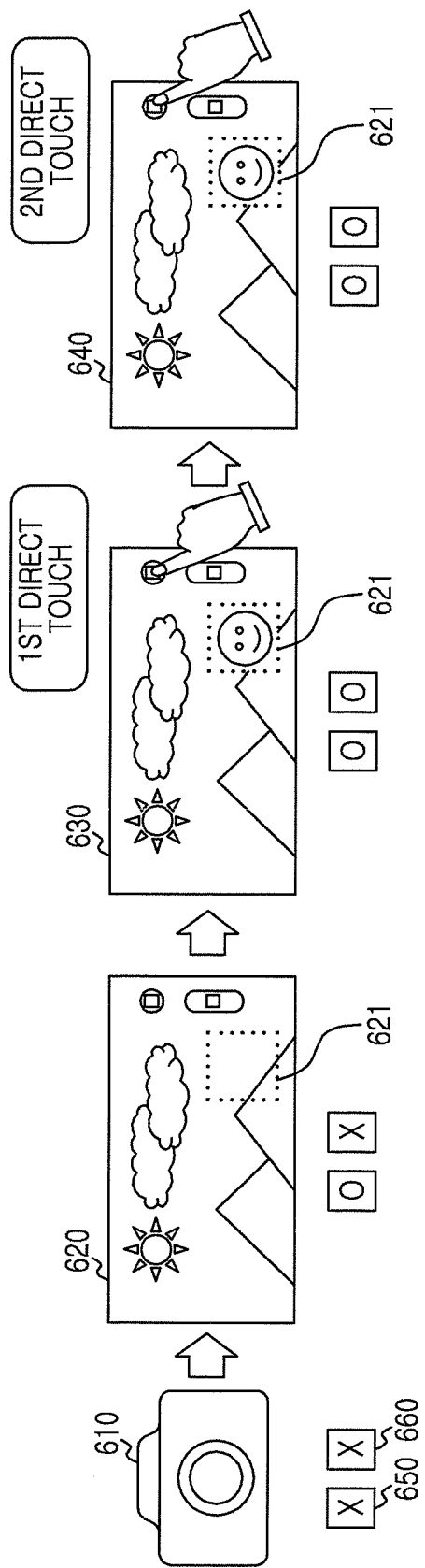
FIG. 6 is a diagram illustrating a process of controlling dual recording in a portable terminal including dual cameras according to the fourth embodiment of the present disclosure.

FIG. 6 is a diagram illustrating a process of controlling dual recording in a portable terminal including dual cameras according to the fourth exemplary embodiment of the present disclosure.

Referring to FIG. 6, initially, a 1st camera and a 2nd camera are all in off states 650 and 660 as shown in an image processing device 610. After that, if a camera application is executed, the 1st camera turns on and the 2nd camera maintains the off state (620). At this time, the portable terminal can display a 1st picture of the 1st camera on a screen and further, display a region 621 in which a 2nd picture of the 2nd camera will be located. Reference numeral '650' represents an operation state of the 1st camera, and reference numeral '660' represents an operation state of the 2nd camera.

Next, if a user finger, a stylus pen (or electronic pen) or the like firstly touches a shutter object corresponding to a dual picture recording start instruction (hereinafter, referred to as a '1st direct touch'), the portable terminal starts up the 2nd camera of the off state and displays the 2nd picture of the 2nd camera in the corresponding region 621 as shown in a screen 630. According to various exemplary embodiments of the present disclosure, the portable terminal starts up the 2nd camera of the off state but does not display the 2nd picture of the 2nd camera in the corresponding region 621 and can display only a frame for confirming a location of the 2nd picture of the 2nd camera, in the corresponding region 621.

After that, if the user finger, the stylus pen (or electronic pen) or the like secondly touches the shutter object corresponding to the dual picture recording start instruction (hereinafter, referred to as a '2nd direct touch'), the portable terminal synthesizes the 1st and 2nd pictures of the 1st and 2nd cameras and starts recording the synthesized result as shown in a screen 640.

Next, when the user finger, the stylus pen (or electronic pen) or the like touches a shutter object corresponding to a dual picture recording stop instruction (not shown), the portable terminal stops dual picture recording and stores the recorded picture.

Figure 7:
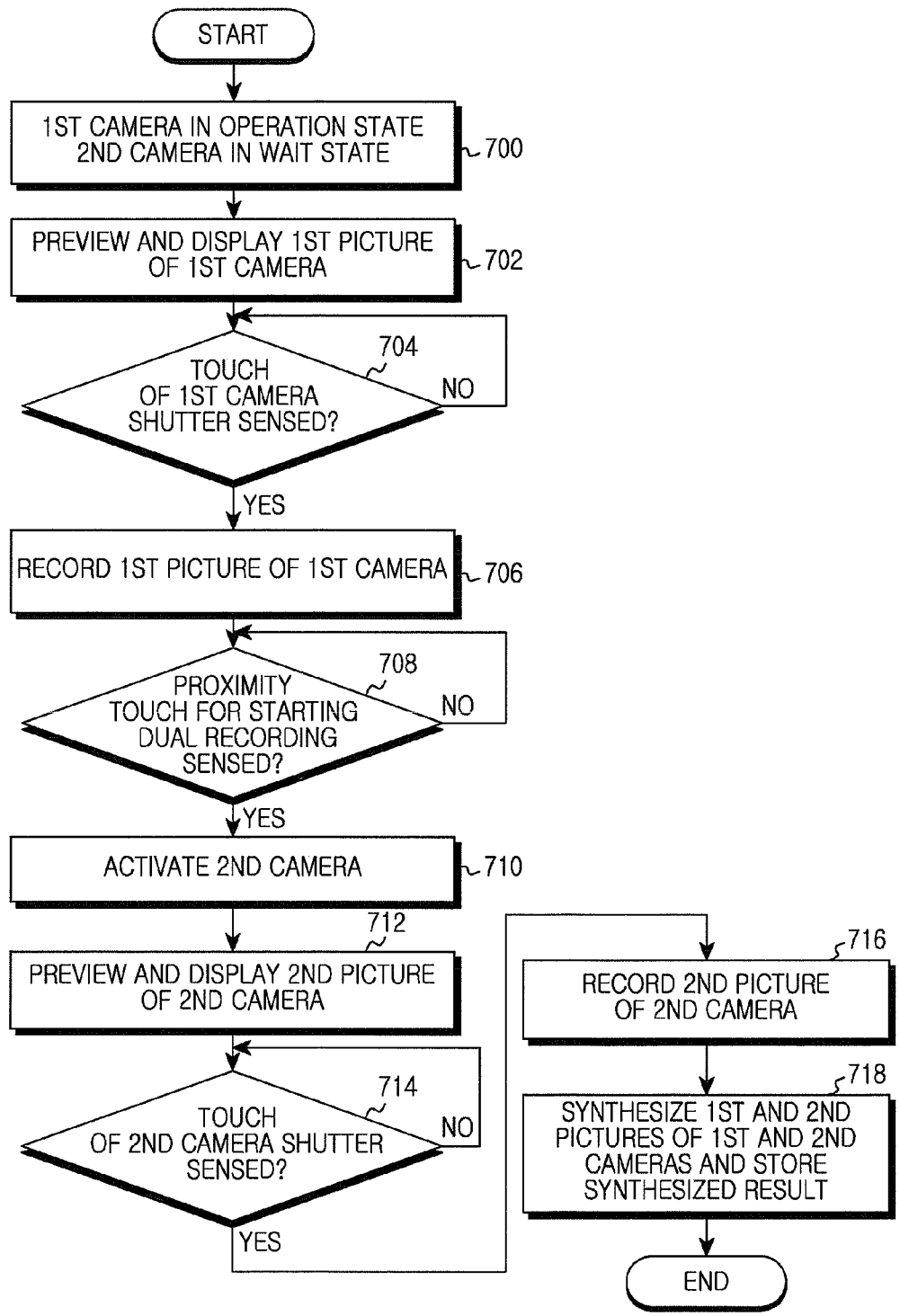
FIG. 7 is a flowchart illustrating a process of controlling dual recording in a portable terminal including dual cameras according to the first embodiment of the present disclosure.

FIG. 7 is a flowchart illustrating a process of controlling dual recording in a portable terminal including dual cameras according to the first exemplary embodiment of the present disclosure.

Referring to FIG. 7, in operation 700, the electronic device operates a 1st camera and sets a 2nd camera to a wait state. Here, the 2nd camera of the wait state cannot be started up until power is supplied.

Next, in operation 702, the electronic device displays a 1st picture of the 1st camera. If a touch of a 1st camera shutter is sensed in operation 704, the electronic device proceeds to operation 706 and starts recording the 1st picture of the 1st camera.

After that, in operation 708, the electronic device determines if a proximity touch (referring to FIG. 12A or FIG. 13A) for starting dual picture recording is detected. Upon proximity touch detection, in operation 710, the electronic device activates the 2nd camera of the off state and, in operation 712, displays a 2nd picture of the 2nd camera in a corresponding region. According to various exemplary embodiments of the present disclosure, the electronic device starts up the 2nd camera of the off state but does not display the 2nd picture of the 2nd camera in the corresponding region and can display only a frame for confirming a location of the 2nd picture of the 2nd camera, in the corresponding region.

Next, if a touch of a 2nd camera shutter is detected in operation 714, the electronic device proceeds to operation 716 and starts recording the 2nd picture of the 2nd camera.

After that, in operation 718, the electronic device synthesizes the 1st and 2nd pictures of the 1st and 2nd cameras and stores the synthesized result.

In FIG. 7, the electronic device can start the dual picture recording after starting recording the 1st picture of the 1st camera. Unlike this, the electronic device can start the dual picture recording without starting recording the 1st picture of the 1st camera according to various exemplary embodiments of the present disclosure. For example, when the electronic device is displaying the 1st picture of the 1st camera, upon detection of the proximity touch, the electronic device can start up the 2nd camera and display the 2nd picture of the 2nd camera and next, when displaying the 1st and 2nd pictures of the 1st and 2nd cameras through a PIP function, the electronic device can start the dual picture recording through the direct touch.

Figure 8:
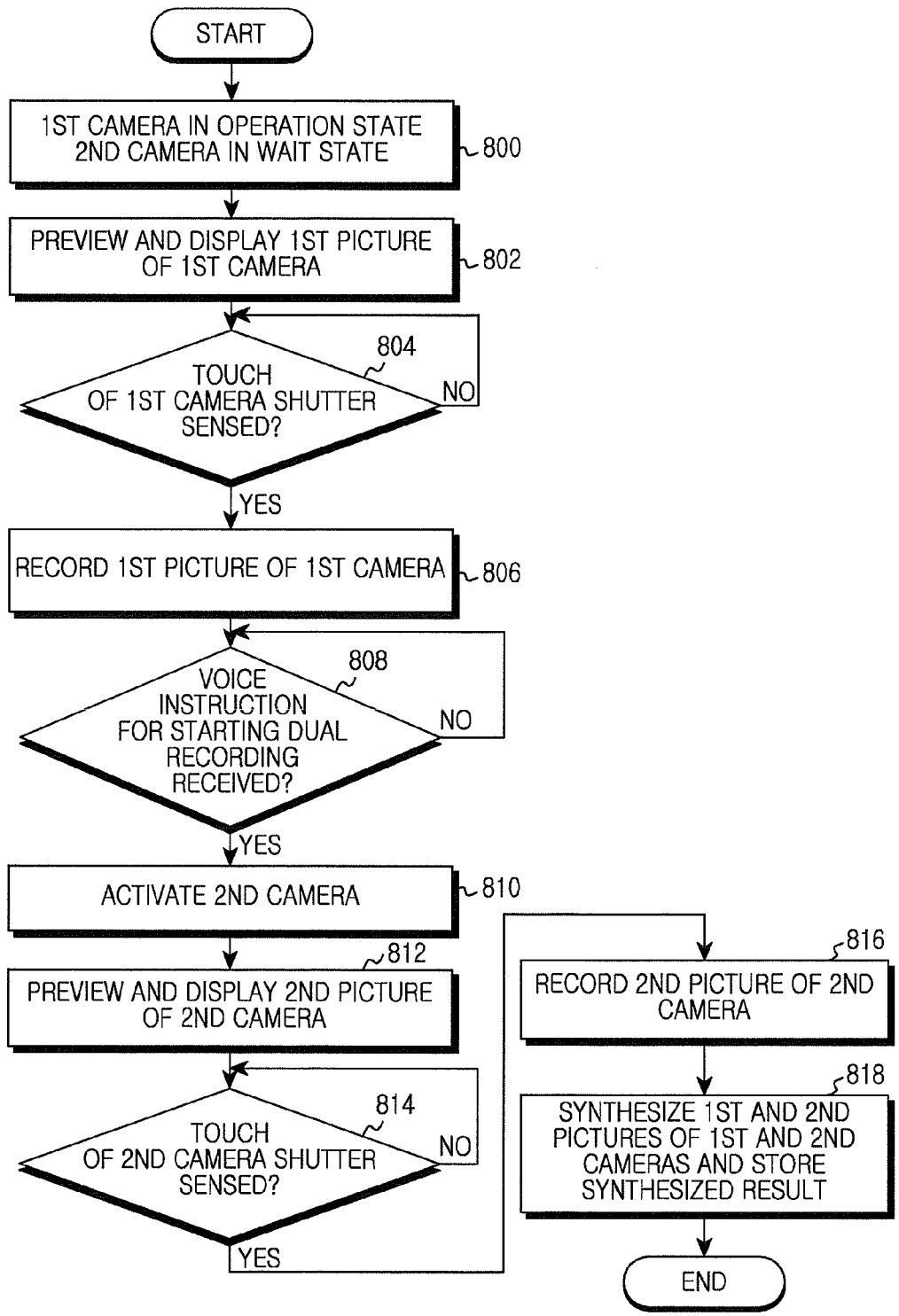
FIG. 8 is a flowchart illustrating a process of controlling dual recording in a portable terminal including dual cameras according to the second embodiment of the present disclosure.

FIG. 8 is a flowchart illustrating a process of controlling dual recording in a portable terminal including dual cameras according to the second exemplary embodiment of the present disclosure.

Referring to FIG. 8, in operation 800, the electronic device operates a 1st camera and sets a 2nd camera to a wait state. Here, the 2nd camera of the wait state cannot be started up until power is supplied.

Next, in operation 802, the electronic device displays a 1st picture of the 1st camera. If a touch of a 1st camera shutter is sensed in operation 804, the electronic device proceeds to operation 806 and starts recording the 1st picture of the 1st camera.

After that, in operation 808, the electronic device determines if a voice instruction for starting dual picture recording is detected. When the voice instruction corresponding to a dual picture recording start instruction is detected, in operation 810, the electronic device activates the 2nd camera of the off state and, in operation 812, displays a 2nd picture of the 2nd camera in a corresponding region. According to various exemplary embodiments of the present disclosure, the electronic device starts up the 2nd camera of the off state but does not display the 2nd picture of the 2nd camera in the corresponding region and can display only a frame for confirming a location of the 2nd picture of the 2nd camera, in the corresponding region.

Next, if a touch of a 2nd camera shutter is detected in operation 814, the electronic device proceeds to operation 816 and starts recording the 2nd picture of the 2nd camera.

After that, in operation 818, the electronic device synthesizes the 1st and 2nd pictures of the 1st and 2nd cameras and stores the synthesized result.

In FIG. 8, the electronic device can start the dual picture recording after starting recording the 1st picture of the 1st camera. Unlike this, the electronic device can start the dual picture recording without starting recording the 1st picture of the 1st camera according to various exemplary embodiments of the present disclosure. For example, when the electronic device is displaying the 1st picture of the 1st camera, upon detection of the voice instruction, the electronic device can start up the 2nd camera and display the 2nd picture of the 2nd camera and next, when displaying the 1st and 2nd pictures of the 1st and 2nd cameras through a PIP function, the electronic device can start the dual picture recording through the direct touch.

Figure 9:
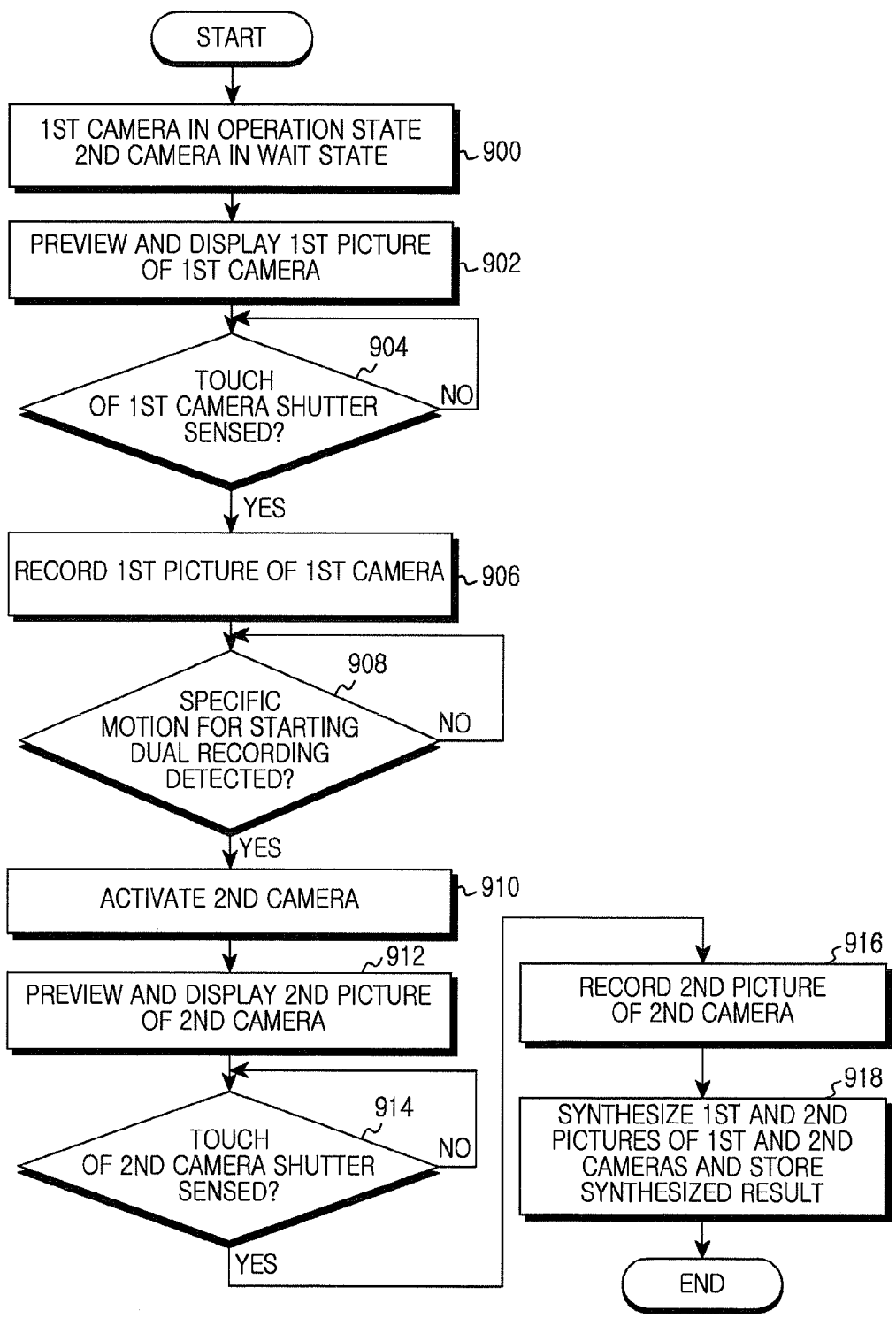
FIG. 9 is a flowchart illustrating a process of controlling dual recording in a portable terminal including dual cameras according to the third embodiment of the present disclosure.

FIG. 9 is a flowchart illustrating a process of controlling dual recording in a portable terminal including dual cameras according to the third exemplary embodiment of the present disclosure.

Referring to FIG. 9, in operation 900, the electronic device operates a 1st camera and sets a 2nd camera to a wait state. Here, the 2nd camera of the wait state cannot be started up until power is supplied.

Next, in operation 902, the electronic device displays a 1st picture of the 1st camera. If a touch of a 1st camera shutter is sensed in operation 904, the electronic device proceeds to operation 906 and starts recording the 1st picture of the 1st camera.

After that, in operation 908, the electronic device determines if a specific motion for starting dual picture recording is detected through a motion recognition sensor. When the specific motion corresponding to a dual picture recording start instruction is detected, in operation 910, the electronic device activates the 2nd camera of the off state and, in operation 912, displays a 2nd picture of the 2nd camera in a corresponding region. According to various exemplary embodiments of the present disclosure, the electronic device starts up the 2nd camera of the off state but does not display the 2nd picture of the 2nd camera in the corresponding region and can display only a frame for confirming a location of the 2nd picture of the 2nd camera, in the corresponding region.

Next, if a touch of a 2nd camera shutter is detected in operation 914, the electronic device proceeds to operation 916 and starts recording the 2nd picture of the 2nd camera.

After that, in operation 918, the electronic device synthesizes the 1st and 2nd pictures of the 1st and 2nd cameras and stores the synthesized result.

In FIG. 9, the electronic device can start the dual picture recording after starting recording the 1st picture of the 1st camera. Unlike this, the electronic device can start the dual picture recording without starting recording the 1st picture of the 1st camera according to various exemplary embodiments of the present disclosure. For example, when the electronic device is displaying the 1st picture of the 1st camera, upon detection of the specific motion through the motion recognition sensor, the electronic device can start up the 2nd camera and display the 2nd picture of the 2nd camera and next, when displaying the 1st and 2nd pictures of the 1st and 2nd cameras through a PIP function, the electronic device can start the dual picture recording through the direct touch.

Figure 10:
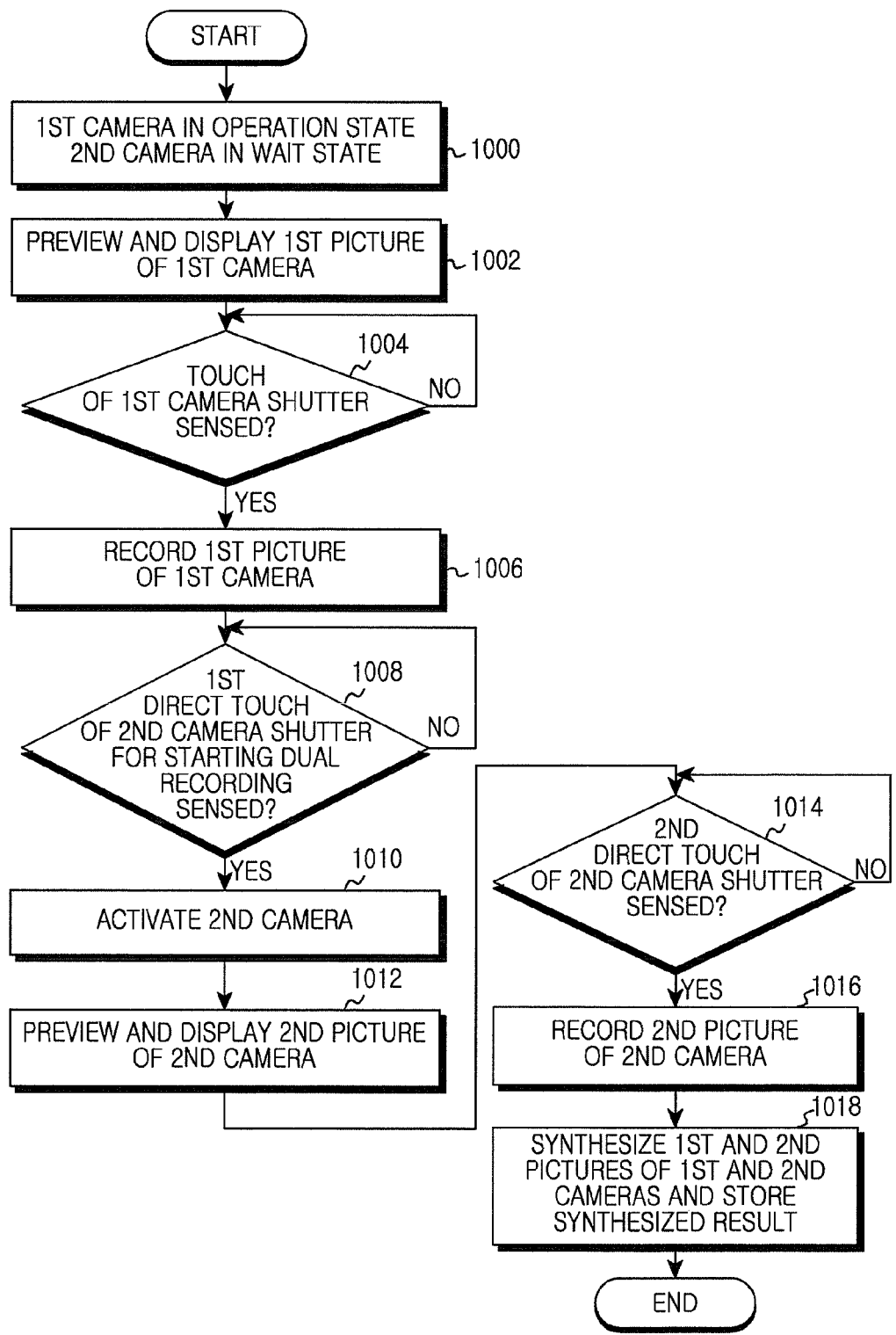
FIG. 10 is a flowchart illustrating a process of controlling dual recording in a portable terminal including dual cameras according to the fourth embodiment of the present disclosure.

FIG. 10 is a flowchart illustrating a process of controlling dual recording in a portable terminal including dual cameras according to the fourth exemplary embodiment of the present disclosure.

Referring to FIG. 10, in operation 1000, the electronic device operates a 1st camera and sets a 2nd camera to a wait state. Here, the 2nd camera of the wait state cannot be started up until power is supplied.

Next, in operation 1002, the electronic device displays a 1st picture of the 1st camera. If a touch of a 1st camera shutter is sensed in operation 1004, the electronic device proceeds to operation 1006 and starts recording the 1st picture of the 1st camera.

After that, in operation 1008, the electronic device determines if a 1st direct touch of a 2nd camera shutter for starting dual picture recording is detected. When the 1st direct touch corresponding to a dual picture recording start instruction is detected, in operation 1010, the electronic device activates the 2nd camera of the off state and, in operation 1012, displays a 2nd picture of the 2nd camera in a corresponding region. According to various exemplary embodiments of the present disclosure, the electronic device starts up the 2nd camera of the off state but does not display the 2nd picture of the 2nd camera in the corresponding region and can display only a frame for confirming a location of the 2nd picture of the 2nd camera, in the corresponding region.

Next, if a 2nd direct touch of a 2nd camera shutter is detected in operation 1014, the electronic device proceeds to operation 1016 and starts recording the 2nd picture of the 2nd camera.

After that, in operation 1018, the electronic device synthesizes the 1st and 2nd pictures of the 1st and 2nd cameras and stores the synthesized result.

In FIG. 10, the electronic device can start the dual picture recording after starting recording the 1st picture of the 1st camera. Unlike this, the electronic device can start the dual picture recording without starting recording the 1st picture of the 1st camera according to various exemplary embodiments of the present disclosure. For example, when the electronic device is displaying the 1st picture of the 1st camera, upon detection of the 1st direct touch, the electronic device can start up the 2nd camera and display the 2nd picture of the 2nd camera and next, when displaying the 1st and 2nd pictures of the 1st and 2nd cameras through a PIP function, the electronic device can start the dual picture recording through the 2nd direct touch.

As described above, various exemplary embodiments of constructions and operations for processing a plurality of images using a plurality of screen regions have been disclosed in this specification. But, in addition to these, additional various exemplary embodiments can be implemented or various modifications and changes can be made in this specification. For instance, all or some of respective operations disclosed in this specification can be performed in parallel simultaneously, or some operations can be omitted, or other additional operations can be included.

Figure 11:
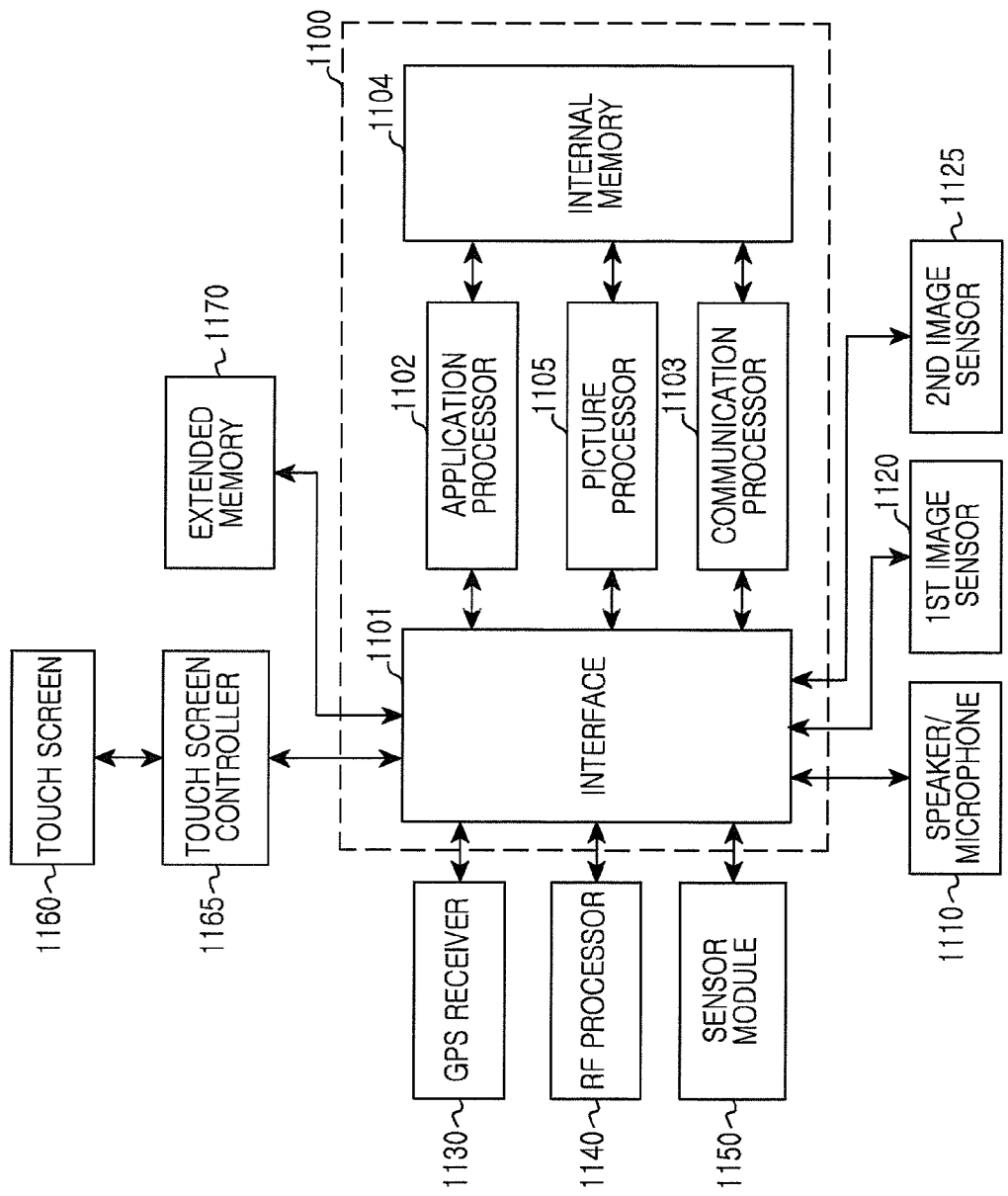
FIG. 11 is a block diagram illustrating a construction of an electronic device according to an exemplary embodiment of the present disclosure.

FIG. 11 illustrates a construction of an electronic device according to an exemplary embodiment of the present disclosure.

The electronic device can be a portable electronic device, and can be a device such as a portable terminal, a mobile terminal, a mobile pad, a media player, a tablet computer, a handheld computer, or a Personal Digital Assistant (PDA). Also, the electronic device can be any portable electronic device including a device combining two or more functions among these devices.

Referring to FIG. 11, the electronic device includes a controller 1100, a speaker/microphone 1110, a 1st image sensor 1120, a 2nd image sensor 1125, a Global Positioning System (GPS) receiver 1130, a Radio Frequency (RF) processor 1140, a sensor module 1150, a touch screen 1160, a touch screen controller 1165, and an extended memory 1170.

The controller 1100 can include an interface 1101, one or more processors 1102 and 1103, an internal memory 1104, and a picture processor 1105. According to cases, the entire controller 1100 can be also called a processor. The interface 1101, the application processor 1102, the communication processor 1103, the internal memory 1104, and the picture processor 1105 can be separate constituent elements or can be integrated into one or more integrated circuits.

The picture processor 1105, an Image Signal Processor (ISP), converts output data (e.g., raw data) from the 1st camera 1120 and the 2nd camera 1125 into image frame (Red, Green, Blue (RGB)/YUV) data having a format of a predefined rule, and provides the image frame data to the application processor 1102.

The application processor 1102 executes various software programs and performs various functions for the electronic device. The communication processor 1103 performs processing and control for voice communication and data communication. Also, in addition to this general function, the processors 1102 and 1103 play even a role of executing a specific software module (i.e., instruction set) stored in the extended memory 1170 or the internal memory 1104 and performing specific various functions corresponding to the module. That is, the processors 1102, 1103, and 1105 interlock with software modules stored in the extended memory 1170 or the internal memory 1104, and control dual picture recording for picture data from the picture processor 1105.

For example, when the 1st camera 1120 is in an operation state and the 2nd camera 1125 is in a wait state, the application processor 1102 displays a 1st picture of the 1st camera 1120. When a touch of a 1st camera shutter is sensed, the application processor 1102 starts recording the 1st picture of the 1st camera, and detects a 1st input (e.g., a proximity touch, a voice instruction, a direct touch, and a specific motion) for starting dual picture recording and, when the 1st input corresponding to a dual picture recording start instruction is detected, the application processor 1102 activates the 2nd camera, and displays a 2nd picture of the 2nd camera in a corresponding region. According to various exemplary embodiments, the application processor 1102 starts up the 2nd camera but does not the 2nd picture of the 2nd camera in the corresponding region and can display only a frame for confirming a location of the 2nd picture of the 2nd camera in the corresponding region and, when a 2nd direct touch of a 2nd camera shutter is detected, the application processor 1102 synthesizes the 1st and 2nd pictures of the 1st and 2nd cameras and stores the synthesized result.

Alternately, the application processor 1102 can start the dual picture recording after starting recording the 1st picture of the 1st camera 1120 but, according to other various exemplary embodiments, the application processor 1102 can start the dual picture recording without starting recording the 1st picture of the 1st camera 1120. For example, when the application processor 1102 is displaying the picture of the 1st image sensor 1120, upon detection of the 1st input, the application processor 1102 can start up the 2nd image sensor 1125 and display the 2nd picture of the 2nd camera 1125 and next, when displaying the 1st and 2nd pictures of the 1st and 2nd image sensors in a PIP function, the application processor 1102 can start the dual picture recording through a 2nd input.

Meantime, other processors (not shown) can include one or more data processors, image processors, or codecs. The data processor, the image processor and the codec can be separately constructed. Also, they can be constructed by various processors performing different functions. The interface 1101 is connected to the touch screen controller 1165 and extended memory 1170 of the electronic device.

The sensor module 1150 can be coupled to the interface 1101 and enable various functions. For example, a motion sensor and an optical sensor can be coupled to the interface 1101 and sense a motion of the electronic device and sense light from the exterior, respectively. Besides this, a global positioning system and other sensors such as a temperature sensor, a biometric sensor, or the like can be coupled to the interface 1101 and perform related functions.

The 1st and 2nd image sensors 1120 and 1125 can be coupled with the sensor module 1150 through the interface 1101 and perform a camera function such as photo and video clip recording. Also, in another exemplary embodiment, the 1st and 2nd cameras 1120 and 1125 can be separated independent from the electronic device and connected with the electronic device using wireless connection such as Near Field Communication (NFC), Wireless Fidelity (WiFi) Direct or the like.

In more detail, the 1st image sensor 1120 is located in rear of the electronic device, and the 2nd image sensor 1125 is located in front of the electronic device. Also, although not illustrated, the electronic device can include an optical unit, a signal processing unit, and the like. The optical unit can be driven by a mecha-shutter, a motor, and an actuator, or can perform operations of zooming, focusing and the like by the actuator. The optical unit takes a peripheral image, and an image sensor senses an image taken by the optical unit and converts the sensed image into an electrical signal. Here, the image sensor can be a Complementary Metal Oxide Semiconductor (CMOS) or a Charged Coupled Device (CCD), and can be a high definition image sensor. The image sensor of the camera can embed a global shutter. The global shutter performs a function similar to that of the mecha-shutter that is built in the image sensor.

In various exemplary embodiments of the present disclosure, the image sensor can be a sensor capable of sensing an image of Ultra High Definition (UHD) class or more. And, the image sensed in the image sensor is converted into a digital image through the signal processing unit and is outputted. Output data from the plurality of cameras can be raw data.

The RF processor 1140 performs a communication function. For example, under the control of the communication processor 1103, the RF processor 1140 converts an RF signal into a baseband signal and provides the baseband signal to the communication processor 1103, or converts a baseband signal from the communication processor 1103 into an RF signal and transmits the RF signal. Here, the communication processor 1103 processes the baseband signal in various communication schemes. For example, the communication scheme can include, though not limited to, a Global System for Mobile Communication (GSM) communication scheme, an Enhanced Data GSM Environment (EDGE) communication scheme, a Code Division Multiple Access (CDMA) communication scheme, a Wireless-Code Division Multiple Access (W-CDMA) communication scheme, a Long Term Evolution (LTE) communication scheme, an Orthogonal Frequency Division Multiple Access (OFDMA) communication scheme, a Wireless-Fidelity (Wi-Fi) communication scheme, a Wireless interoperability for Microwave Access (WiMAX) communication scheme or/and a Bluetooth communication scheme.

The speaker/microphone 1110 can take charge of voice recognition, voice replication, digital recording, and audio stream input and output of a phone function. That is, the speaker/microphone 1110 converts a voice signal into an electrical signal, or converts an electrical signal into a voice signal. Though not illustrated, a detachable earphone, headphone or headset can be connected to the electronic device through an external port.

The touch screen controller 1165 can be coupled to the touch screen 1160. The touch screen 1160 and the touch screen controller 1165 can detect a contact and a motion or an interruption thereof by using, though not limited to, any multi-touch sensing technology including other proximity sensor arrays or other elements as well as capacitive, resistive, infrared and surface acoustic wave technologies for determining one or more contact points with the touch screen 1160.

The touch screen 1160 provides an input/output interface between the electronic device and a user. That is, the touch screen 1160 forwards a user's touch input to the electronic device. Also, the touch screen 1160 is a medium for showing an output of the electronic device to the user. That is, the touch screen 1160 shows a visual output to the user. This visual output is presented in the form of a text, a graphic, a video, and a combination thereof. In an exemplary embodiment of the present disclosure, the touch screen 1160 displays images taken by the 1st and 2nd image sensors 1120 and 1125 and photographing information.

The touch screen 1160 can use various displays. For example, the touch screen 1160 can use, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The touch screen 1160 inputs data using a user's finger but, recently, can have an input device (generally, a 'touch pen' or 'electronic pen') of a pen shape as a data supplementary input means and further have a pen touch panel (not shown) selectively inputting data by this input device. Though not illustrated, the pen touch panel can include a sensor Printed Circuit Board (PCB) in which a plurality of X-axis coil arrays and Y-axis coil arrays are arranged to be at right angle, and a shield plate installed below the sensor PCB and cutting off external electromagnetic waves.

The GPS receiver 1130 converts signals received from artificial satellites into information of position, speed, time, etc. For example, a distance between the satellite and the GPS receiver 1130 is determined by multiplying a speed of light and signal reaching time, and a position of the electronic device is measured in the known triangulation principle by obtaining accurate locations and distances of the three satellites.

The extended memory 1170 or the internal memory 1104 can include high-speed random access memory and/or non-volatile memory such as one or more magnetic disk storage devices, one or more optical storage devices, and/or flash memories (for example, Not AND (NAND) memories, Not OR (NOR) memories).

The extended memory 1170 or the internal memory 1104 stores software. A software constituent element includes an Operating System (OS) software module, a communication software module, a graphic software module, a user interface software module, a Moving Picture Experts Group (MPEG) module, a camera software module, one or more application software modules and the like. Also, because the module, the software constituent element, can be expressed as a set of instructions, the module can be also expressed as an instruction set. The module can be also expressed as a program.

Further to the present disclosure, the extended memory 1170 can store images or videos taken by the 1st camera 1120 and the 2nd camera 1125.

The OS software includes various software constituent elements controlling general system operation. Control of the general system operation represents, for example, memory management and control, storage hardware (device) control and management, power control and management and the like. This OS software performs even a function of making smooth communication between various hardware (devices) and software constituent elements (modules).

The communication software module can perform communication with other electronic devices such as computers, servers, portable terminals and/or the like through the RF processor 1140. And, the communication software module is constructed in a protocol structure corresponding to a corresponding communication scheme.

The graphic software module includes various software constituent elements for providing and displaying a graphic on the touch screen 1160. The term of graphic is used as meaning including a text, a web page, an icon, a digital image, a video, an animation and the like.

The user interface software module includes various software constituent elements associated with a user interface. The user interface software module includes information about how a state of the user interface is changed, whether the change of the state of the user interface is carried out in which condition, or the like.

The camera software module includes a camera related software constituent element enabling camera related processes and functions. The application module includes a web browser including a rendering engine, an electronic mail (e-mail), an instant message, word processing, keyboard emulation, an address book, a touch list, a widget, Digital Right Management (DRM), voice recognition, voice replication, a position determining function, a location-based service and the like. The memories 1170 and 1104 can include additional modules (instructions) besides the aforementioned modules. Or, according to need, the memories 1170 and 1104 may not use some modules (instructions).

In relation to the present disclosure, the application module includes instructions (referring to FIG. 7 to FIG. 10) for controlling dual picture recording.

For example, the application module includes an instruction of displaying a 1st picture of the 1st camera 1120 when the 1st camera 1120 is in an operation state and the 2nd camera 1125 is in a wait state, and starting recording the 1st picture of the 1st camera when a touch of a 1st camera shutter is sensed, and detecting a 1st input (e.g., a proximity touch, a voice instruction, a direct touch, and a specific motion) for starting dual picture recording, and activating the 2nd camera when the 1st input corresponding to a dual picture recording start instruction is detected, and displaying a 2nd picture of the 2nd camera in a corresponding region and, according to various exemplary embodiments, being able to start up the 2nd camera but not display the 2nd picture of the 2nd camera in the corresponding region and display only a frame for confirming a location of the 2nd picture of the 2nd camera in the corresponding region, and synthesizing the 1st and 2nd pictures of the 1st and 2nd cameras and storing the synthesized result when a 2nd direct touch of a 2nd camera shutter is detected.

Alternately, the application module includes an instruction of being able to start the dual picture recording after starting recording the 1st picture of the 1st camera 1120 but, according to other various exemplary embodiments, start the dual picture recording without starting recording the 1st picture of the 1st camera 1120. For example, when the application module is displaying the picture of the 1st image sensor 1120, upon detection of the 1st input, the application module can start up the 2nd image sensor 1125 and display the 2nd picture of the 2nd camera 1125 and next, when displaying the 1st and 2nd pictures of the 1st and 2nd image sensors in a PIP function, the application module can start the dual picture recording through a 2nd input.

Also, various functions of the electronic device according to the present disclosure mentioned above and to be mentioned below can be executed by hardware including one or more processing and/or Application Specific Integrated Circuits (ASICs), and/or software, and/or a combination of them.

Figure 12A:
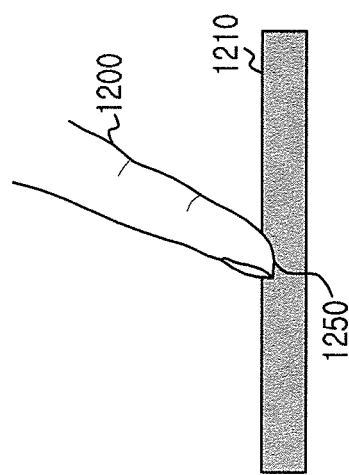
FIGS. 12A and 12B are diagrams for describing a proximity touch and a direct touch according to the first embodiment of the present disclosure.
Figure 12B:
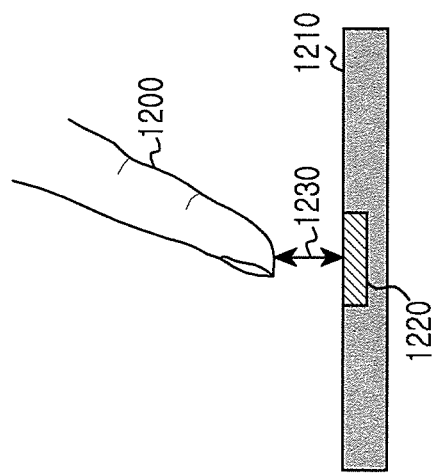

FIGS. 12A and 12B are diagrams for describing a proximity touch and a direct touch according to the first exemplary embodiment of the present disclosure.

FIG. 12A illustrates the proximity touch. The proximity touch signifies a touch within a range of a certain distance 1230 between a touch screen 1210 and a finger 1200, before a user touches a dual picture recording start execution button 1220 of the touch screen 1210 with the finger 1200. The proximity touch is called hovering as another term.

FIG. 12B illustrates the direct touch. The direct touch represents a state in which the finger 1200 is in contact (1250) to a specific region (e.g., a dual picture recording start execution button 1220) of the touch screen 1210.

FIGS. 13A and 13B are diagrams for describing a proximity touch and a direct touch according to the second exemplary embodiment of the present disclosure.

FIG. 13A illustrates the proximity touch. The proximity touch signifies a touch within a range of a certain distance 1330 between a pen touch panel 1310 and a touch pen 1300, before a user touches a dual picture recording start execution button 1320 displayed on the pen touch panel 1310 with the touch pen 1300. The proximity touch is called hovering as another term.

FIG. 13B illustrates the direct touch. The direct touch represents a state in which the touch pen 1300 is in contact (1350) to a specific region (e.g., a dual picture recording start execution button 1320) of the pen touch panel 1310.

As described above, upon dual picture recording, exemplary embodiments of the present disclosure control camera power using a 1st input and a 2nd input, thereby being able to minimize a camera startup time delay.

It will be appreciated that embodiments of the present disclosure according to the claims and description in the specification can be realized in the form of hardware, software or a combination of hardware and software. Any such software can be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details can be made therein without departing from the spirit and scope of the disclosure as defined by the appended claims.

What is claimed is:

1. A method for operating an electronic device having a first image sensor and a second image sensor, the method comprising:
    detecting a first input in off states of the first image sensor and the second image sensor;
    while the second image sensor is in the off state:
        turning on the first image sensor, when the first input is detected;
        displaying a first image acquired from the first image sensor on a display;
        displaying, on the first image, a frame for insertion of a second image acquirable from the second image sensor without displaying the second image in the frame;
    turning on the second image sensor, when a second input is detected; and
    displaying, on the first image, the second image acquired from the second image sensor in the frame.

2. The method of claim 1, further comprising:
    recording the first image and the second image displayed as a preview image on the display, when a third input is detected,
    wherein the third input comprises an input for starting the recording of the first image and the second image.

3. The method of claim 1, wherein the second image sensor is configured to change from a wait state to an operation state when the second input is detected.

4. The method of claim 3, wherein the second input is entered through one of a hovering motion, a voice instruction, a pre-defined motion, and a direct touch.

5. The method of claim 4, wherein the pre-defined motion is detected from a motion recognition sensor or a third image sensor.

6. The method of claim 1, further comprising:
splitting the display into at least a first screen and a second screen; and
displaying the first image on the first screen and the second image on the second screen.

7. The method of claim 1, wherein the first image sensor is equipped at a first side of the electronic device, and the second image sensor is equipped at a second side opposite to the first side of the electronic device.

8. An electronic device for processing an image, the electronic device comprising:
a first image sensor configured to acquire a first image;
a second image sensor configured to acquire a second image;
a display configured to display at least one of the first image and the second image;
at least one memory configured to store image information; and
at least one processor configured to:
detect a first input in off states of the first image sensor and the second image sensor,
while the second image sensor is in the off state:
turn on the first image sensor when the first input is detected,
cause the display to display the first image acquired from the first image sensor on the display,
cause the display to display, on the first image, a frame for insertion of a second image acquirable from the second image sensor without displaying the second image in the frame,
turn on the second image sensor, when a second input is detected, and
cause the display to display, on the first image, the second image acquired from the second image sensor in the frame.

9. The electronic device of claim 8, wherein the second image sensor is configured to change from a wait state to an operation state when the second input is detected.

10. The electronic device of claim 9, wherein the second input is entered through one of a hovering motion, a voice instruction, a pre-defined motion, and a direct touch.

11. The electronic device of claim 10, wherein the processor is configured to record the first image and the second image displayed as a preview image on the display, when a third input is detected,
wherein the third input comprises an input for starting the recording of the first image and the second image.

12. The electronic device of claim 10, wherein the pre-defined motion is detected from a motion recognition sensor or a third image sensor.

13. The electronic device of claim 8, wherein the processor is configured to split a view into at least a first screen and a second screen, display the first image on the first screen, and display the second image on the second screen.

14. The electronic device of claim 8, wherein the first image sensor is equipped at a first side of the electronic device, and the second image sensor is equipped at a second side opposite to the first side of the electronic device.

15. A method for processing an image in an electronic device, the method comprising:
when a first camera is in an operation state and a second camera is in a wait state:
acquiring a first image from the first camera and previewing the acquired first image;
recording the first image acquired from the first camera in response to a photographing instruction;
displaying, on the first image, a frame for insertion of a second image acquirable from the second camera without displaying the second image in the frame;
when a proximity touch input is detected, changing the second camera from the wait state to an operation state and acquiring a second image from the second camera;
simultaneously previewing the first image and the second image using a Picture In Picture (PIP) function; and
when a touch for a dual image recording instruction is detected, composing and recording the first image and the second image.

16. The method of claim 15, wherein the first image sensor is located in a first side of the electronic device, and
wherein the second image sensor is located in a second side opposite to the first side of the electronic device.

17. An electronic device comprising:
a first camera positioned on a first side of the electronic device;
a second camera positioned on a second side opposite to the first side of the electronic device;
a touch screen positioned on the first side of the electronic device; and
a processor configured to:
when the first camera is in an operation state and the second camera is in a wait state:
acquire a first image from the first camera and previewing the acquired first image;
record the first image acquired from the first camera in response to a photographing instruction;
cause the touch screen to display, on the first image, a frame for insertion of a second image acquirable from the second camera without displaying the second image in the frame;
change the second camera from the wait state to an operation state and acquire a second image from the second camera, when a proximity touch input is detected;
cause the touch screen to simultaneously preview display the first image and the second image using a Picture In Picture (PIP) function; and
compose and record the first image and the second image, when a touch for a dual image recording instruction is detected.

18. The method of claim 1, wherein the first input comprises an input for executing a camera application, and wherein if the camera application is executed, the first image sensor turns on and the second image sensor maintains the off state.

19. The method of claim 1, wherein the first image and the frame are simultaneously displayed as a preview image on the display.

20. The method of claim 2, wherein the first input, the second input and the third input are the same type or different type for executing other operations.

21. The electronic device of claim 8, wherein the first input comprises an input for executing a camera application.

22. The electronic device of claim 8, wherein the first image and the frame are simultaneously displayed as a preview image on the display.

23. The electronic device of claim 11, wherein the first input, the second input and the third input are the same type or different type for executing other operations.

* * * * *